US011075800B2

(12) United States Patent
Anderson et al.

(10) Patent No.: US 11,075,800 B2
(45) Date of Patent: Jul. 27, 2021

(54) CHARACTERIZING CLIENT-SERVER CONNECTION CONFIGURATIONS ACCORDING TO COMMUNICATION LAYER ATTRIBUTES

(71) Applicant: Morgan Stanley Services Group Inc., New York, NY (US)

(72) Inventors: Karl E. Anderson, Columbia, MD (US); William R. Schnieders, Laurel, MD (US)

(73) Assignee: MORGAN STANLEY SERVICES GROUP INC., New York, NY (US)

( * ) Notice: Subject to any disclaimer, the term of this patent is extended or adjusted under 35 U.S.C. 154(b) by 264 days.

(21) Appl. No.: 16/236,798

(22) Filed: Dec. 31, 2018

(65) Prior Publication Data

US 2020/0213192 A1  Jul. 2, 2020

(51) Int. Cl.
*H04L 12/24* (2006.01)
*H04L 29/08* (2006.01)
*H04L 29/06* (2006.01)

(52) U.S. Cl.
CPC .......... *H04L 41/0806* (2013.01); *H04L 67/02* (2013.01); *H04L 67/143* (2013.01); *H04L 67/42* (2013.01)

(58) Field of Classification Search
CPC ... H04L 41/0806; H04L 67/02; H04L 67/143; H04L 67/42; H04L 63/1425
USPC .................................................. 709/222, 227
See application file for complete search history.

(56) References Cited

U.S. PATENT DOCUMENTS

| | | | | |
|---|---|---|---|---|
| 6,522,875 B1 * | 2/2003 | Dowling | ................. | H04L 67/26 455/414.3 |
| 6,687,846 B1 * | 2/2004 | Adrangi | .............. | G06F 11/0709 714/17 |
| 7,631,084 B2 * | 12/2009 | Thomas | .................. | H04L 29/06 709/227 |
| 7,698,416 B2 * | 4/2010 | Potti | ...................... | H04L 67/14 709/224 |

(Continued)

OTHER PUBLICATIONS

International Search Report and Written Opinion of the International Searching Authority for International Application No. PCT/US2019/069071 dated Mar. 30, 2020.

*Primary Examiner* — Tesfay Yohannes
(74) *Attorney, Agent, or Firm* — K&L Gates LLP

(57) ABSTRACT

A system and method for characterizing a connection configuration of a client connecting to a computer system. The system can host a web service to which a client is redirected or connected to establish a client session between the client and the web service. The web service then actively and/or passively measures various attributes associated with the communication layers, such as latencies and/or configuration settings associated with each of the communication layers. Based on differences between the attributes of the communication layers, the computer system can characterize the client connection configuration. Various client connection configurations can include conventional connections, connections utilizing an external domain name service, connections through virtual private networks, connections through various proxies, and so on. Based on the characterized connection configuration, the computer system can take various actions, such as terminating the connection between the client and the computer system.

29 Claims, 12 Drawing Sheets

(56) References Cited

U.S. PATENT DOCUMENTS

| | | | | |
|---|---|---|---|---|
| 7,827,256 | B2* | 11/2010 | Phillips | H04L 67/02 |
| | | | | 709/220 |
| 8,621,590 | B2* | 12/2013 | Hoggan | H04W 36/0038 |
| | | | | 726/8 |
| 8,914,471 | B2* | 12/2014 | Pazos | H04H 20/426 |
| | | | | 709/219 |
| 9,288,190 | B1 | 3/2016 | Brinskelle | |
| 9,332,468 | B2* | 5/2016 | Sfar | H04W 36/14 |
| 9,830,180 | B2* | 11/2017 | Tung | G06F 9/45533 |
| 9,888,290 | B1* | 2/2018 | Malhotra | H04N 21/6125 |
| 10,447,711 | B2* | 10/2019 | Kaminsky | G06F 21/31 |
| 10,505,838 | B2* | 12/2019 | Tam | H04L 47/36 |
| 10,681,060 | B2* | 6/2020 | Scheidler | G06F 21/566 |
| 10,747,774 | B2* | 8/2020 | Reynolds | G06F 21/6227 |
| 10,779,054 | B2* | 9/2020 | Sundaram | H04N 21/41407 |
| 2013/0298192 | A1 | 11/2013 | Kumar et al. | |
| 2018/0069878 | A1 | 3/2018 | Martini | |

* cited by examiner

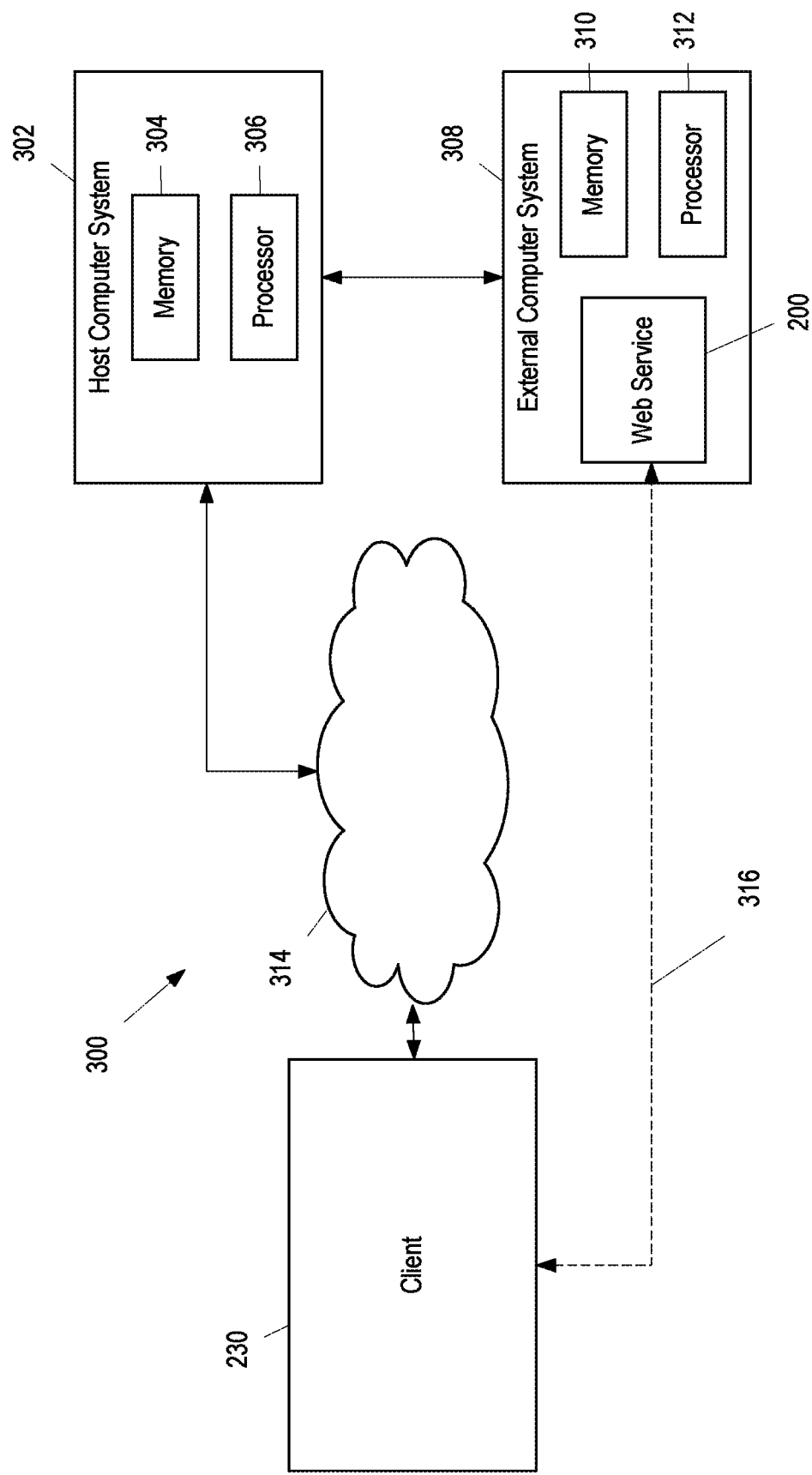

CHARACTERIZING CLIENT-SERVER CONNECTION CONFIGURATIONS ACCORDING TO COMMUNICATION LAYER ATTRIBUTES

BACKGROUND

A client system typically connects to a host system in a number of different ways, either directly over a network, through a virtual private network (VPN), by utilizing an external domain name system (DNS) resolver, through a hypertext transfer protocol (HTTP) proxy, through a hypertext transfer protocol secure (HTTPS)-interception proxy, and so on. Many of the different connection configurations are legitimate techniques for accessing a host by a client; however, some connection configurations can be utilized to intercept sensitive information or to falsify or obfuscate the identity or location of the system that is ultimately seeking to connect to the host. Therefore, certain connection configurations many be indicative of malicious intent by the individual seeking to connect to the host system. In many cases, attempts to obfuscate the identities and/or locations of client systems or application software executed by a client system can be reflected in one or more of the communication layers that define the session between the client system and the host system. The communication layers of a session are the communications protocols that define how data should be packetized, addressed, transmitted, routed, and received by and between the client and the host. By analyzing the distinguishing features, content, latencies, and other attributes associated with each of the communication layers, one can detect when the system or location-identifying attributes of one or more of the communication layers are mismatched or otherwise incongruent with the other communication layers. When the system or location-identifying attributes of the communication layers are mismatched, that can indicate that different systems are executing different subsets of the communication layers. By determining which communication layers are being executed by different systems, one can determine the particular connection configuration utilized by or otherwise associated with the client system. Determining the particular connection configuration can, in turn, be helpful in assessing any risk that may be associated with the client session, such as misuse of the user's login credentials, unauthorized access by a malicious party, fraud, identity theft, attempts to subvert economic sanctions, and so on.

Prior approaches for detecting the obfuscation or falsification of client identities and/or locations have a number of different disadvantages, including only detecting anomalies associated with a single communication layer, detecting anomalies only in association with a given application or web browser, or not characterizing the type of network obfuscation being utilized. Systems that only detect anomalies associated with a single communication layer or only in association with a given application or web browser are disadvantageous because they cannot detect the full variety of different connection configurations or fail to account for all of the different ways in which different connection configurations can be determined. Further, systems that do not characterize the type of network obfuscation being utilized are disadvantageous for a number of different reasons. For example, the fact that a user is connecting to a host system using a different method than normal is itself valuable information when assessing the security risk posed by a client session, regardless of whether the new connection configuration carries a high degree of risk, because a sudden change in the behavior exhibited by a user could indicate fraud. As another example, some connection configurations that have legitimate purposes can be misused for malicious purposes, such as to facilitate takeovers of users' accounts. Therefore, it can be beneficial to flag a given client session even when the client connection configuration could have a legitimate purpose.

SUMMARY

In one aspect, by measuring the network latencies associated with a client's communication with a server, such as during TCP/IP session setup, TLS setup negotiation, encrypted HTTP, DNS lookups, and application response to JavaScript, the measurements can be compared with expected timing of these respective communication layers to determine if the client is at a location that is expected for their network address and are using applications on devices that are expected. Timing anomalies discovered through this process can be further characterized to determine if they are indicative of specific types of network relays including Virtual Private Networks (VPN), HTTP proxy services, or other types of network relays that mask the true location of a communicating host.

In various implementations, this can be accomplished using an encrypted web service where client web browsers can be redirected to perform measurements. The web service can respond to client requests by providing HTML and JavaScript content that will exercise distinct properties of a web browser to uniquely characterize it and report those results back to the web server. Such web server content can also cause the client web browser to attempt to visit a randomized subdomain in order to perform a non-cached DNS lookup by going to a randomly generated subdomain. Additional communication sessions may be initiated to capture consistent timing.

During the communication between the web browser client and web service, the network communication timing can be monitored at the location of the web service to measure the timing and distinct attributes of, for example, the TCP/IP setup, the TLS setup, the HTTP setup, the application layer setup, and/or the DNS lookup. Measurements can be performed by passively observing network communication or through direct instrumentation of the operating system and application layers of server communication.

In various implementations, to effectively measure response time for DNS, a DNS subdomain service is run that can answer for randomized DNS queries and direct clients to a web service. Such DNS service can be instrumented either directly or passively to measure the time it takes for a HTTP response to generate a subsequent follow-on DNS query and to record which DNS server is being used to query on behalf of the client.

Measurements and session attributes can be associated with specific client interactions and collected and sent to an analysis service to classify and characterize the session and client communication behavior. Classification can include, for example, evaluating timing of specific features with the expected network and application timing. Deviations from expected behavior or detection of specific types of network relays can be recorded in logs and could be used for determining a level of risk for a given client attempts.

These and other benefits of the present invention will be apparent from the description that follows.

FIGURES

The features of various aspects are set forth with particularity in the appended claims. The various aspects, however, both as to organization and methods of operation, together with further objects and advantages thereof, may best be understood by way of example by reference to the following description, taken in conjunction with the accompanying drawings as follows.

FIG. 1 illustrates a logic flow diagram of a process for characterizing a client connection configuration, in accordance with at least one aspect of the present disclosure.

FIG. 10A illustrates a block diagram of a computer network wherein a host redirects a client to an externally hosted web service, in accordance with at least one aspect of the present disclosure.

DESCRIPTION

Figure 1:
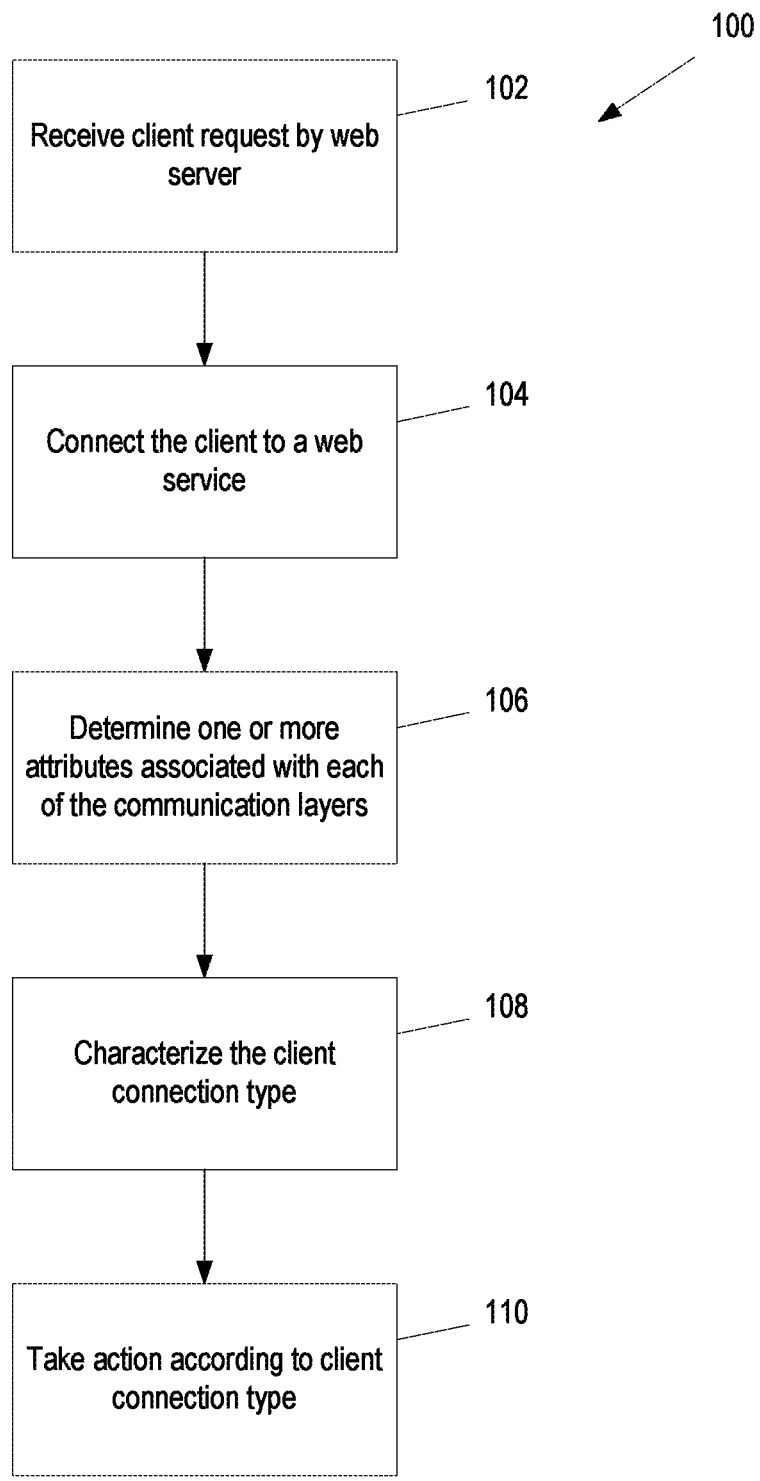

Certain aspects will now be described to provide an overall understanding of the principles of the structure, function, manufacture, and use of the devices and methods disclosed herein. One or more examples of these aspects are illustrated in the accompanying drawings. Those of ordinary skill in the art will understand that the devices and methods specifically described herein and illustrated in the accompanying drawings are non-limiting examples aspects and that the scope of the various aspects is defined solely by the claims. The features illustrated or described in connection with one aspect may be combined with the features of other aspects. Such modifications and variations are intended to be included within the scope of the claims. Furthermore, unless otherwise indicated, the terms and expressions employed herein have been chosen for the purpose of describing the illustrative aspects for the convenience of the reader and not to limit the scope thereof.

When a client (e.g., a web browser) connects to a web server and initiates a session with the web server, several different communication layers are established between the client and the web server. In this context, a "layer" refers to a logical structuring of the hierarchical functions implemented by hardware and/or software within a system, such as in a communication system consisting of a client connected to a server through a telecommunication network. Each communication layer can refer to one or more different functions being executed by software and/or hardware components of the system. Accordingly, a communication layer is the software and/or hardware of the client and/or server that is programmed or configured to execute the communications protocols necessary to effectuate the described functions of the communication layer. Each communication layer can execute a specific communications protocol for that described layer or multiple different communications protocols. Further, the number and type of layers within such a communication system can vary in different conceptual models. For example, the Internet protocol suite model (also referred to as the TCP/IP model) conceptualizes four communication layers: an application layer, a transport layer, an Internet layer, and a link layer. As another example, the Open Systems Interconnection model conceptualizes seven communication layers: an application layer, a presentation layer, a session layer, a transport layer, a network layer, a data link layer, and a physical layer (i.e., the electronic circuit components of the network). Although the particular communication layers can differ between conceptual models, communication systems can always be conceptualized as having multiple communication layers. The attributes associated with particular communication layers (e.g., latency) or between particular communication layers (e.g., differential latency between communication layers) can be utilized to characterize the connection configuration of the client that is connecting to the web server. The web service provider can then take various actions, such as ending the client session, according to the client connection configuration type.

Figure 10B:
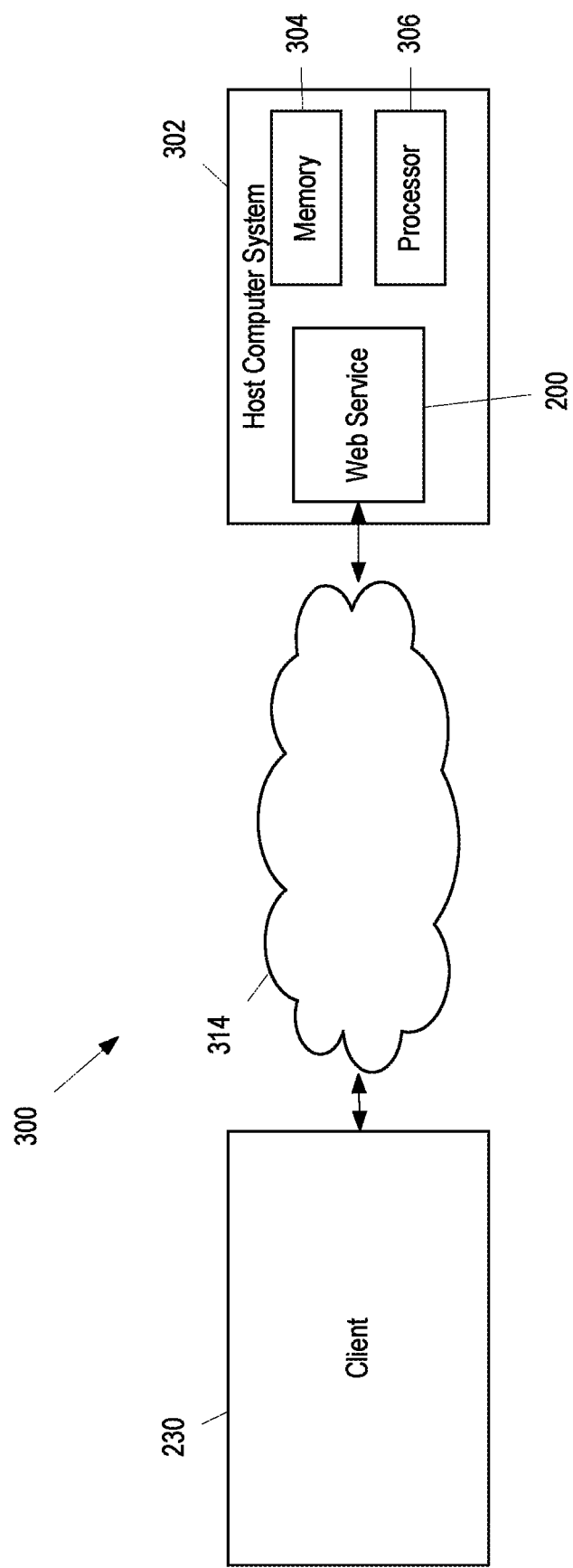
FIG. 10B illustrates a block diagram of a computer network wherein a host connects a client to a hosted web service, in accordance with at least one aspect of the present disclosure.

For example, FIG. 1 illustrates a logic flow diagram of a process 100 for characterizing a client connection configuration, in accordance with at least one aspect of the present disclosure. In the following description of the process 100, reference should also be made to FIGS. 10A and 10B. FIG. 10A illustrates an implementation of a system 300 where a host computer system 302 redirects a client 230 to an external computer system 308 hosting a web service 200 that analyzes the connection configuration of the client 230. FIG. 10B illustrates another implementation of a system 300 where the host computer system 302 hosts the web service 200 that analyzes the connection configuration of the client 230. In other words, FIG. 10B illustrates an implementation where the web service 200 for analyzing the client connection configuration is incorporated into the application stack of the host computer system 302. The process 100 can be executed by a processor(s) or control circuit(s) of a computer system(s), such as the processor(s) 306 of the host computer system 302 illustrated in FIGS. 10A and 10B and/or the processor(s) 312 of the external computer system 308 illustrated in FIG. 10A. Accordingly, the process 100 can be embodied as a set of computer-executable instructions stored in a memory 304, 310 coupled to the respective processors 306, 312 that, when executed by the processors 306, 312, cause the computer systems 302, 308 to perform the described steps.

Accordingly, at step 102, the computer system (e.g., a web server) receives a request from a client 230 to initiate a session, i.e., establish a connection between the computer system 302 and the client 230 through a data network 314 (e.g., the Internet). Such a request can be generated when a client 230 connects to a web page or runs a web application hosted by the computer system 302, for example. When a client 230 connects to the computer system 302, the user of the client 230 may log into the hosted web service using a user identity or account with pre-established credentials. In some aspects, the actions taken by the client 230 and/or the data generated by the analysis of the connection configuration of the client 230 can be associated with the particular user identity with which the user of the client 230 has logged in.

At step 104, the computer system directs the client 230 to a web service 200. In the aspect of the system 300 depicted in FIG. 10A, the host computer system 302 can cause the client 230 to be redirected to form a connection 316 with an externally hosted or third-party web service. This can be beneficial in order to, for example, offload the assessment of the client connection configuration to reduce computing resources consumed by the host computer system 302. In another aspect of the system 300 depicted in FIG. 10B, the computer system 302 can cause the client 230 to be directed to a web service that is hosted by or otherwise associated with the computer system 302. In other words, the web service 200 to which the client 230 is directed can be integrated into the software or application stack executed by the host computer system 302 itself. This can be beneficial in order to, for example, provide the operator of the host computer system 302 with complete control over the data generated by the assessment of the client connection configuration. As described above, the connection between the client 230 and the web service 200 can include several different communication layers, which can then be monitored and measured in order to characterize the connection type of the client 230.

At step 106, the computer system determines one or more attributes associated with each of the communication layers of the connection between the client 230 and the web service 200. In the aspect of the system 300 depicted in FIG. 10A, the host computer system 302 can determine the communication layer attributes by receiving the results of the analysis performed by the web service 200 hosted by the external computer system 308. In another aspect of the system 300 depicted in FIG. 10A, the external computer system 308 can determine the communication layer attributes by analyzing or measuring the attributes via the hosted web service 200 to which the client 230 is connected, as described below. In the aspect of the system 300 depicted in FIG. 10B, the host computer system 302 can determine the communication layer attributes by analyzing or measuring the attributes via the hosted web service 200 to which the client 230 is connected.

The determined attributes can include attributes of individual communication layers (e.g., latency) or attributes between different communication layers (e.g., a difference in latency between two or more communication layers). Differences in the latencies associated with different communication layers can indicate the presence of network relays, which can in turn be utilized to characterize the client connection configuration. Further, the determined attributes can include attributes that are generically applicable to a number of different communication layer types (e.g., the latency associated with a given communication layer) or attributes that are specific to a particular communication layer type (e.g., how the client 230 negotiates with the web service 200 at the TLS layer to address a difference in TLS protocol versions). Still further, the determined attributes can include attributes related to how a particular communication layer is configured. Attributes related to how a communication layer has been configured can include which configuration preferences have been activated or deactivated, the values that particular configuration preferences have been sent to, and other settings for a particular communication layer (e.g., the priority of encryption methods supported in the TLS layer). In one aspect, the web service 200 can measure attributes of the various communication layers via induced behavior and/or passive measurements. In one aspect, the web service 200 can provide content (e.g., HTML and/or JavaScript content) that is transmitted to or downloaded by the client 230 from the web service 200. The provided content can be configured to determine the types of software applications (e.g., a web browser) or operating systems that are handling each communication layer, track latencies associated with each of the communication layers, and so on. By detecting discrepancies between attributes within individual communication layers or across multiple communication layers, such as different types of software applications and/or operating systems executing or associated with different communication layers, different latencies associated with different communication layers, different latencies with an individual communication than would be expected based on the alleged location of the client 230, a different browser configuration associated with a particular communication layer than the browser type advertised at other layers (e.g., utilizing a TLS configuration indicative of Firefox, but Chrome being advertised at the application and/or HTTP layers), and so on, the computer system 302 can detect brokering, mimicry, or relaying of the functions associated with one or more of the communication layers of the client session that are indicative of fraud or the like.

At step 108, the computer system characterizes the particular type or configuration of the client connection based on the attributes determined at step 106. In various aspects, either the host computer system 302 or the external computer system 308 can characterize the client connection type. As described in connection with FIGS. 2-9, the client connection type can include a conventional connection configuration (e.g., a client 230 connected to the web service 200 via a web browser being run on the client's 230 own computer), a client utilizing an external DNS, a client connecting through a VPN, a client utilizing an external DNS and connecting through a VPN, a client connected via an HTTPS-interception proxy, a client connected via an HTTP caching proxy, a client connected via a SOCKS proxy, a client that has been hijacked by malware or is a bot, and so on. In one aspect, the computer system 302, 308 can store profiles for various client connection types in a memory 304, 310 and retrieve the client connection type profile that corresponds most closely to the determined attributes associated with the communication layers. In another aspect, the computer system 302, 308 can execute a machine-learning model that has been trained via supervised or unsupervised machine-learning techniques to correlate communication layer attributes with one or more client connection types. Accordingly, the determined communication layer attributes can be fed to the machine-learning model, which can then output the particular client connection type corresponding thereto.

At step 110, the computer system can take some action according to the client connection type determined at step 108. The action can vary depending on the determined client connection type. In one aspect, the action taken by the computer system can include terminating the client session with the client 230. For example, if the computer system determines that the client has been hijacked by malware, is a bot, is subject to a SOCKS proxy, and so on, it may be desirable to simply terminate the client session to prevent the host computer system 302 and/or a user's personal information, financial information, or other data from being compromised. In some aspects, the computer system can take additional actions, such as providing a warning or notification to the client 230 indicating why the client session is being terminated, sending a message (e.g., an email or text message) to contact information associated with the user identity indicating that the client session was terminated, and so on. In one aspect, the action taken by the computer system 302 can include recording the client connection type associated with the user identity. By tracking the connection types utilized by the user identity over time, the computer system 302 can determine when the user identity is deviating from its normal course of behavior. In some aspects, when the computer system 302 determines that the user identity is accessing the host computer system's 302 web pages, web applications, or other web services utilizing unconventional means or is otherwise behaving unexpectedly, the actions taken by the computer system 302 can include increasing the authorization or security level (e.g., requiring two-factor authentication) for the user identity to take particular actions with the web services (e.g., a financial transaction, including transfer of financial assets), sending a report to a human operator for review, and/or terminating the client session with the web service.

To further illustrate the concepts discussed above in connection with FIG. 1, FIGS. 2-9 illustrate various client connection types and the differences in communication layer attributes between the different client connection types that allow the computer systems described herein to characterize the connection type of the client 230 initiating a session. By evaluating the different arrangement of the communication layers 210 in the different client connection types, one can visualize how the computer systems described herein can ascertain the connection type utilized by the client 230. The connection types illustrated in FIGS. 2-9 are conceptualized as including at least five communication layers 210: an application layer 212, an HTTP layer 214, a TLS layer 216, a TCP/IP layer 218, and a name service layer 220. In some connection types, an additional communication layer 210, an HTTP-only layer 222, is further considered.

The application layer 212 is the communication layer utilized to directly communicate with the client 230. The attributes of the application layer 212 that are measured can include, for example, browser features that are indicative of configuration, graphic rendering, timing of responsiveness to automated queries, availability, and support of web browser features, which can in turn indicate the type of web browser associated with the application layer 212. The measured attributes can further include the ability of the application layer 212 to interpret and efficiently execute JavaScript and WebAssembly code.

The aforementioned attributes of the application layer 212 can be utilized to uniquely identify the client 230 (as in browser fingerprinting, for example), determine if the client 230 is operating in accordance with its declared client type, and/or determine if the functions of the application layer 212 are being executed at the same location as the functions of the other communication layers 210 in order to characterize the connection configuration or the client 230. Accordingly, the various attributes of the application layer 212 that indicate the type or configuration of the web browser or other client can be utilized to characterize the connection configuration by, for example, comparing the advertised client type to the client type indicated by the features of the application layer 212 or comparing the indicated client type to the client type indicated by one or more of the other communication layers 210. If the advertised client type differs from the client type indicated by the application layer 212 and/or the client types indicated by the analyzed attributes of the application layer 212 and other communication layers 210, then the web service 200 can determine that the particular application protocol is being executed by a non-client system. If advertised client type and/or the client type indicated by the other communication layers 210 do not differ from the client type indicated by the application layer 212, then the web service 200 can determine that the application protocol is being executed by the client 230, as is the case is a conventional connection configuration (FIG. 2), for example.

The HTTP layer 214 is the communication layer utilized to make requests and direct responses between the client 230 and a computer system to which the client 230 is connected. In some conceptual models, the HTTP layer 214 is considered to be an aspect of the application layer 212, but it can also be conceptualized as its own distinct layer, as depicted in FIGS. 2-9. In some connection types, the HTTP layer 214 can be, for example, intercepted and interpreted by web proxy services that operate independently of the client 230. Accordingly, how responses are interpreted, how caching instructions are interpreted, how redirection is handled, how content is assembled, and how errors and exceptions are handled by the HTTP layer 214 can indicate whether the HTTP layer 214 is being executed by the client 230 or another computer system. The attributes of the HTTP layer 214 that the web service 200 can detect or measure to characterize the connection configuration of the client 230 include, for example, the type of the client 230, the developer of the client 230, the version of the client 230, the configuration of HTTP fields within the client 230, how the client 230 handles the HTTP fields, or the presence of annotations (i.e., additional HTTP request fields) within the traffic of the HTTP layer 214 (because proxy services may add HTTP request fields to the HTTP traffic, such as the "via" or "X-Forwarded-For" HTTP header fields).

The HTTP fields of the HTTP layer 214 can be utilized to characterize the connection configuration because which HTTP fields are present, the configuration or organization of the HTTP fields, and/or how HTTP fields are handled within the HTTP layer 214 are indicative of specific types and/or versions of web browsers. Accordingly, the settings of the HTTP layer 214 can be utilized to characterize the connection configuration by, for example, determining whether the web browser type or other client type identified by the settings of the HTTP protocol is different than the web browser type or other client type identified by other communication layers 210. If the client type differs between the HTTP layer 214 and other communication layers 210, then the web service 200 can determine that the HTTP protocol is being executed by a non-client system. If the client type indicated by the HTTP layer 214 does not deviate from the client type indicated by the other communication layers 210, then the web service 200 can determine that the HTTP protocol is being executed by the client 230, as is the case is a conventional connection configuration (FIG. 2), for example. In other aspects, various other application layer protocols can be analyzed in addition to or in lieu of the HTTP layer 214.

The TLS layer 216 is the communication layer responsible for establishing, configuring, and supporting the features of TLS, which is a cryptographic protocol that is utilized in most web communications for encrypting communications between two computer applications. In a conventional connection between a client 230 and a server, the TLS protocol is executed by the client 230. However, the TLS protocol can also be executed by proxy services or be otherwise brokered outside of the client 230 in other connection configurations. Accordingly, the manner in which encrypted HTTP traffic is handled by the TLS layer 216 can indicate whether the TLS protocol is being executed by the client 230 or a proxy service (or is otherwise brokered outside the client 230). The attributes of the TLS layer 216 that the web service 200 can utilize to characterize the connection configuration of the client 230 include the latency associated with communications by the TLS layer 216 and the settings (e.g., the priority and type of encryption methods supported) of the TLS layer 216 dictated by the computer application with which the web service 200 is communicating.

The latency of the TLS layer 216 can be utilized to characterize the connection configuration by, for example, comparing the measured latency of the TLS layer 216 to the latencies associated with one or more of the other communication layers 210. Further, the settings for the TLS protocol executed by the TLS layer 216 are configured uniquely for a given web browser, web application, or brokering service and can thus be utilized to identify the type of system or fingerprint the particular system that is executing the TLS protocol. The TLS protocol settings can include, for example, the lifetime, timeouts, and/or keepalives associated with the TLS session, the maximum number of bytes passed to the TLS layer 216 at a time, whether particular versions of the TLS protocol are supported or enforced, and so on. Accordingly, the settings of the TLS layer 216 can be utilized to characterize the connection configuration by, for example, determining whether the system identified by the settings of the TLS protocol is different than the system identified by other communication layers 210. In particular, if the systems or applications indicated by the configuration settings of the TLS layer 216 differ from the systems or applications indicated by the other communications layers 210, that can indicate that modifications have been made to the communication stack or that mimicry is occurring within the communication stack. If the latency of the TLS layer 216 deviates from the latencies of the other communication layers 210 and/or the settings of the TLS layer 216 identify a different system than the client 230, then the web service 200 can determine that the TLS protocol is being executed by a non-client system, as is the case in an HTTPS-interception proxy (FIG. 6), for example. If the latency of the TLS layer 216 does not deviate from the latencies of the other communication layers 210 and/or the settings of the TLS layer 216 identify the client 230, then the web service 200 can determine that the TLS protocol is being executed by the client 230, as is the case in a conventional connection configuration (FIG. 2), for example. In other aspects, various other encryption layers executing other encryption protocols (e.g., SSL) can be analyzed by the present system and method.

The TCP/IP layer 218 is the communication layer responsible for transporting network packets from the originating host to a destination (e.g., the destination host specified by an IP address), verifying correctness of data, controlling data transmission rates, and so on. In some aspects, the TCP/IP layer 218 can be conceptualized as incorporating one or more functions of the transport layer and/or Internet layer in the Internet protocol suite model. The attributes of the TCP/IP layer 218 that the web service 200 can utilize to characterize the connection configuration of the client 230 include the latency associated with communications by the TCP/IP layer 218, the use of known VPN endpoint IP addresses by the TCP/IP layer 218, and the settings of the TCP/IP layer 218 dictated by the computer application with which the web service 200 is communicating.

The latency of the TCP/IP layer 218 can indicate the routing behavior associated with the connection configuration of the client 230. If the TCP/IP layer 218 is being brokered by a service such as a proxy, there can be differences between (i) the latency of the TCP/IP layer 218 and the latencies of one or more of the other communication layers 210 and/or (ii) the measured latency of the TCP/IP layer 218 and the expected latency of the TCP/IP layer 218 given the advertised network endpoint of the client 230. The expected latency for a given network endpoint can be determined based on the expected route of data transmitted to the network endpoint and the profiled latencies associated with the network(s) through which the data is transmitted. The latency of the TCP/IP layer 218 can be measured according to the roundtrip data transmission time and/or the time delay associated with the receipt of automated responses by the web service 200.

The settings for the TCP/IP protocols executed by the TCP/IP layer 218 can provide a range of information that can be utilized to characterize the connection type of the client 230. For example, the setup settings, session establishment settings, and underlying state machine timeouts for automated events can be distinct for different operating systems (e.g., Windows, iOS, Linux, or Android) or different combinations of operating systems and applications. Accordingly, the web service 200 can determine the operating system type that is executing the TCP/IP layer 218 and compare that determined operating system to the operating system type advertised by the client 230. If the identified operating systems differ, then a different computer system than the client 230 is executing the TCP/IP layer 218 and the web service 200 can characterize the connection configuration accordingly. As another example, various settings of the TCP/IP protocols can be adjusted to minimize data fragmentation and/or handle higher latencies. Adjusting these settings can indicate that the operator of the system executing the TCP/IP layer 218 is expecting higher than normal rates of data fragmentation and/or higher than normal data transmission latencies, which can, in turn, indicate that the TCP/IP layer 218 is being executed by a system that is remote from the client 230. These settings can include, for example, the maximum transmission unit (which, if set to a low value, can reduce network delay) set for the TCP protocol, maximum segment size set for the TCP protocol, window scale of the TCP protocol (which can be adjusted if the expected bandwidth-delay product is larger than a particular threshold), whether selective or delayed acknowledgement of received data has been implemented by the computer system executing the TCP/IP layer 218 (which, if implemented, can improve network performance over lossy, high-delay Internet paths and/or if an application is transmitting data in smaller chunks), and so on. If the settings associated with the TCP/IP layer 218 are indicative of the TCP/IP layer 218 not being executed by the client 230, then the web service 200 can characterize the connection configuration accordingly.

The name service layer 220 is the communication layer responsible for choosing which naming service is used to broker the discovery of a domain associated with an IP address via, for example, a DNS protocol. The name service layer 220 applies to both the client 230 and the server and is commonly called prior to the TCP/IP session being initiated between two computer systems. The client naming service called by the name service layer 220 is often set to the DNS server of the Internet service provider as a default; however, the client naming service can be set to other DNS servers. Therefore, identifying the particular naming service called by the client at the name service layer 220 can in some cases indicate that a special host or network configuration is being utilized. In particular, the originating requesting service and/or a proxy service could perform the naming service lookup, depending on the configuration of the web proxy service. In one aspect, the web service 200 can be configured to induce the client 230 to perform an uncached DNS lookup, which can then be examined and measured by the web service 200. Accordingly, the web service 200 can detect which DNS service is being used, the latency associated with the DNS lookup, and/or settings associated with the name service layer 220 in order to detect unusual DNS configurations that are indicative of proxy configurations, unusual host configurations, or unusual network configurations. For example, the latency of the DNS lookup differing from the latencies associated with one or more of the other communication layers 210 can indicate that a system other than the client 230 is performing the DNS lookup. As another example, the DNS lookup calling a different DNS provider than the normal DNS provider for a given client 230 or network can indicate that a system other than the client 230 is performing the DNS lookup. As another example, various settings associated with the name service layer 220, such as the response to DNS caching directives (i.e., time to live values) and how the name service layer 220 responds when multiple ambiguous results are returned from a DNS query, can be either actively or passively measured by the web service 200 to determine whether the name service layer 220 is being executed by a different computer system than the type of computer system indicated by attributes associated with other communication layers 210 and/or the computer system type normally associated with the user account.

The HTTP-only layer 222 is the communication layer responsible for handling unencrypted (i.e., not encrypted via TLS) HTTP communications. In some connection configurations, the unencrypted, HTTP-only communication traffic can be handled via a proxy apart from the encrypted communication traffic. Therefore, attributes of the HTTP-only layer 222 can be indicative of various types of proxy configurations. For example, whether additional HTTP header fields have been introduced into requests and whether there has been additional caching of content in the HTTP-only layer 222 can indicate that the HTTP-only layer 222 is being executed by a different computer system than the TLS layer 216 because such modifications may not occur when the HTTP communications are being handled over the TLS layer 216, unless the proxy service is also intercepting the TLS layer 216. Accordingly, the web service 200 can detect attributes of the HTTP-only layer 222 that are indicative of proxy configurations and other such connection configurations.

In one aspect, the web service 200 can be configured to passively measure the attributes of and between the communication layers 210. In another aspect, the web service 200 can be configured to actively measure the attributes of the communication layers 210 by inducing behavior in the system(s) executing the communication layers 210 and analyzing the induced response. For example, the web service 200 can be configured to intentionally not send acknowledgements or other replies in response to communications received from the system(s) executing the communication layers 210 in order to analyze how the system(s) respond(s) and/or the length of time before the system(s) respond(s) to the failed replies. How and in what time frame the originating system(s) respond to such induced errors can indicate the settings of the originating system for the particular communication layer 210 and the latency associated with the originating system(s), which can in turn be utilized to characterize the connection configuration of the client 230. As another example, the web service 200 can be configured to provide the client 230 with content of a known size in order to measure the time taken by the client 230 (or a system purporting to be the client 230) to download and/or respond to the provided content.

In addition to the attributes of the individual communication layers 210 that can be measured, the web service 200 can also measure or compare attributes between the communication layers 210 to characterize the client configuration type. For example, the web service 200 could be programmed to measure latencies associated with the different communication layers 210 and then compare those measured latencies to determine whether the latencies associated with one or more of the communication layers 210 deviate from the other communication layers 210. When the latencies associated with different communication layers 210 deviate from each other, that can indicate that different computer systems in different locations are executing different communication layers 210. As another example, the web service 200 could be programmed to determine operating system-identifying characteristics associated with different communication layers 210 and then compare those characteristics to determine whether different operating systems are executing different communication layers 210. The software (e.g., web browser) and/or operating system executing each of the communication layers 210 can be detected by observing the configuration settings and other identifying characteristics in the protocols being executed at each of the communication layers 210, such as tagging of software versions, preferences and the ordering of features or settings (as in the TLS layer 216 and the HTTP layer 214, for example), use and reaction to timeouts, missing data, error conditions, support for conditional features, and whether default or custom settings are being utilized at a particular communication layer 210. By determining whether the configuration settings indicate that consistent software or operating systems are being utilized to execute the protocols at each communication layer 210, it can be determined whether different computer systems are executing different communication layers 210 and/or whether the advertised software or operating system matches or otherwise corresponds to the detect configuration settings. Mismatches between the communication layers 210 and/or between the advertised and typical configuration settings can indicate that additional software is being utilized or that mimicry settings are being utilized to falsify or obfuscate the use of particular software applications. As an illustrative example, if the configuration settings of the TLS layer 216 are indicative of Firefox being run on Linux, the configuration settings of the HTTP layer 214 are indicative of Chrome being run on Windows, and the configuration settings of the TCP/IP layer 218 are indicative of macOS, then the web service 200 can determine that these different communication layers 210 are being executed by different computer systems and characterize the client connection configuration accordingly. In particular, the configuration settings associated with the various communication layers 210 can be strong indicators of the software and/or operating system being utilized to execute the communication layers 210 and network latency can additionally be indicative of the location(s) of the computer system(s) executing the communication layers 210. Accordingly, the web service 200 can characterize the client configuration type according to which communication layers 210 are being executed by different computer systems.

As discussed above in connection with step 108 of the process 100 illustrated in FIG. 1, the computer system 302 can characterize the connection configuration associated with the client 230 according to attributes associated with the various communication layers 210. In one aspect, the computer system 302 can characterize the connection configuration by via a monitoring/measurement module 202 and a correlation/model scoring module 204 executed by the web service 200. The monitoring/measurement module 202 can be programmed to measure the various attributes of and between the communication layers 210. The correlation/model scoring module 204 can be programmed to receive the attributes associated with the communication layers 210 measured by monitoring/measurement module 202, compare the measured attributes to pre-characterized or stored profiles of various types of connection configurations, and determine which of the connection configuration profiles the given combination of measured attributes corresponds. The correlation/model scoring module 204 can be programmed to utilize various statistical classification techniques for correlating the measured attributes of the communication layers 210 with the connection configuration profiles. In one aspect, the correlation/model scoring module 204 can include a machine-learning system trained via supervised or unsupervised machine-learning techniques to correlate a feature vector of communication layer attributes with a set of connection configuration profiles.

Figure 2:
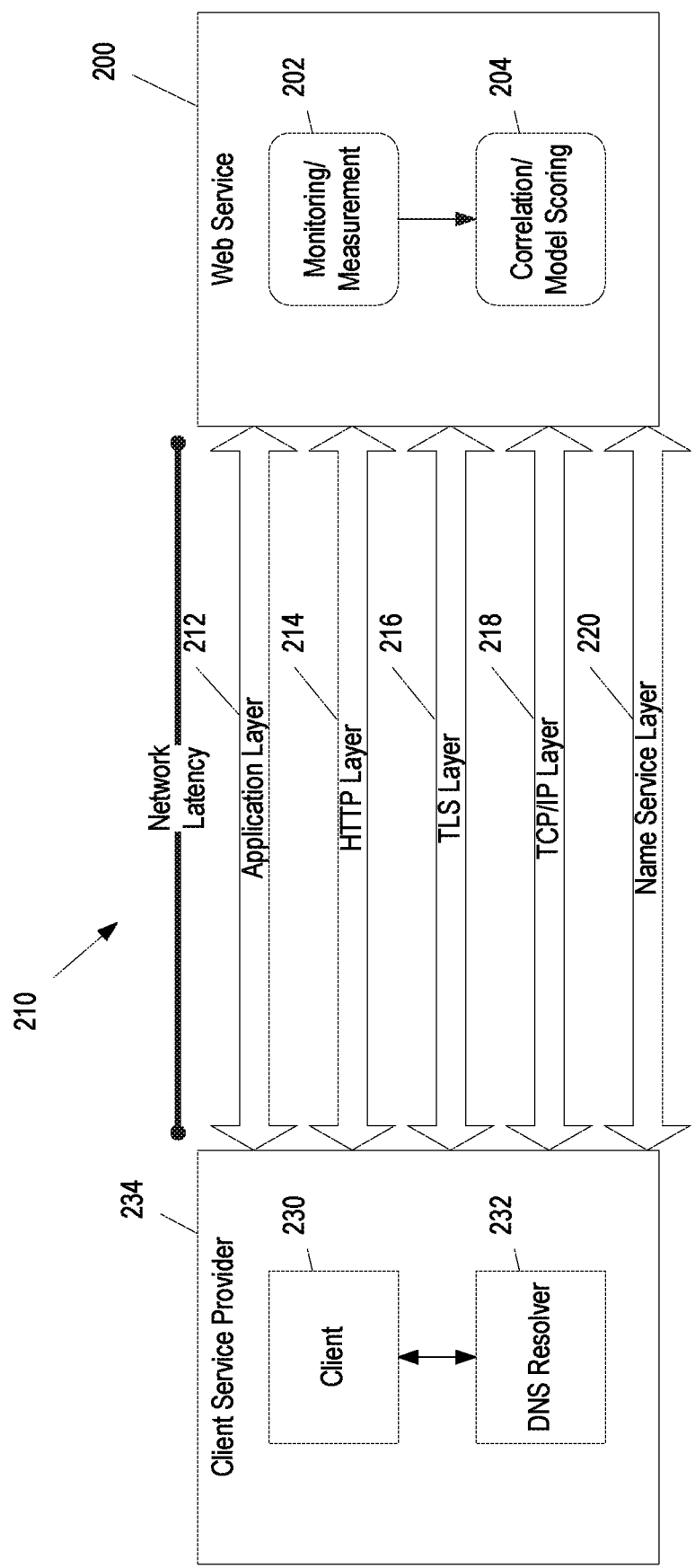
FIG. 2 illustrates a block diagram of a conventional connection configuration between a client and a server, in accordance with at least one aspect of the present disclosure.

For example, FIG. 2 illustrates a conventional connection configuration between the client 230 and the web service 200. In such a connection configuration, the client 230 utilizes a DNS resolver 232 provided by the client service provider 234 and each of the communication layers 210 is executed by and between the client 230 (and/or the client service provider 234) and the web service 200 to which the client 230 is connected. Accordingly, a computer system 302 executing the process 100 can characterize, at step 108, the illustrated connection configuration when the attributes of the communication layers 210, determined at step 106, indicate that all of the communication layers 210 are being executed by the client 230 and/or the client service provider 234.

Figure 3:
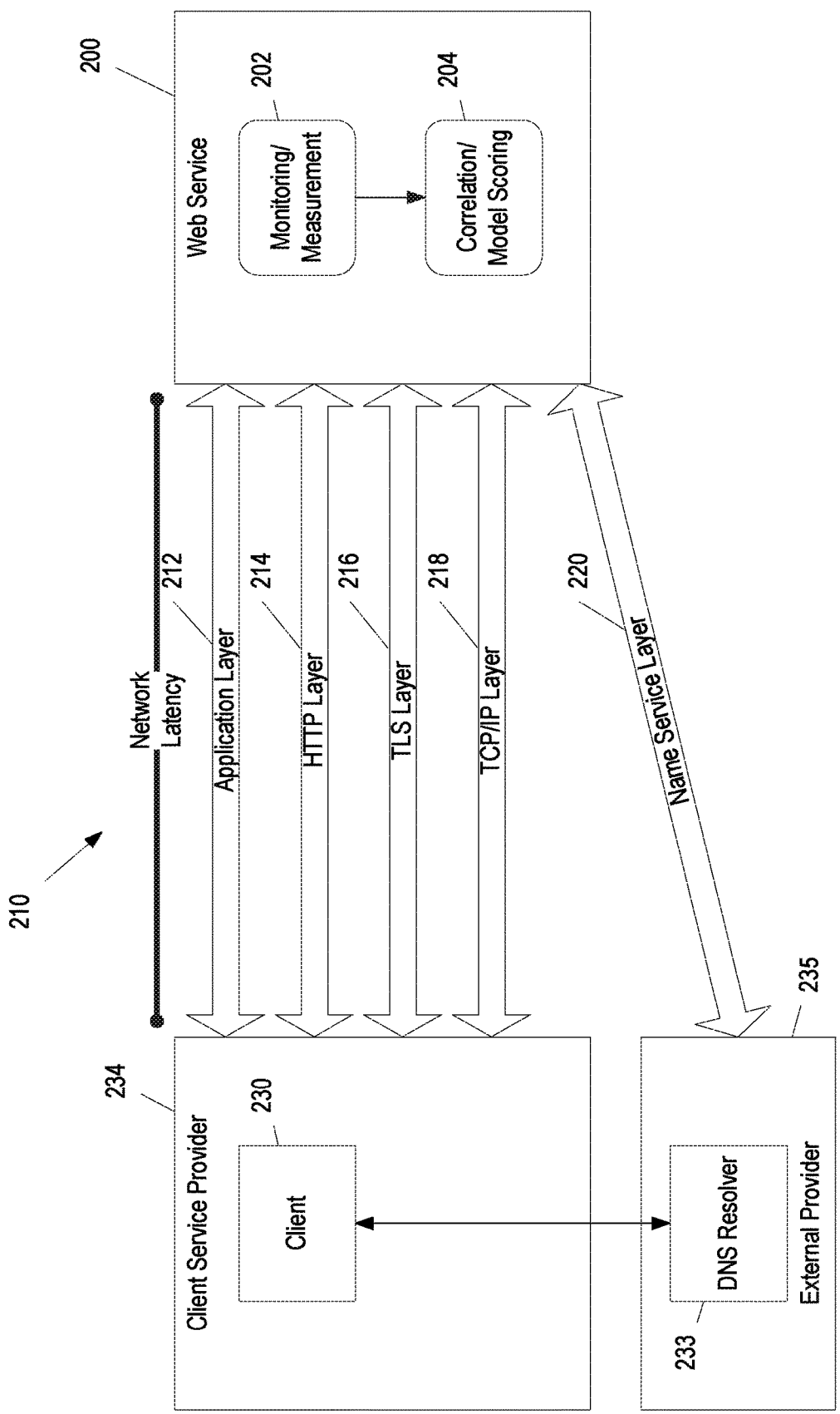
FIG. 3 illustrates a block diagram of a connection configuration between a client utilizing an external DNS and a server, in accordance with at least one aspect of the present disclosure.

FIG. 3 illustrates a connection configuration where the client 230 utilizes an external DNS resolver 233. In such a connection configuration, the client 230 initiates DNS queries utilizing a DNS resolver 233 that is hosted or provided by an external provider 235. Accordingly, a computer system 302 executing the process 100 can characterize, at step 108, the illustrated connection configuration when the attributes of the communication layers 210, determined at step 106, indicate that the name service layer 220 is being executed by a different computer system than the rest of the communication layers 210.

Figure 4:
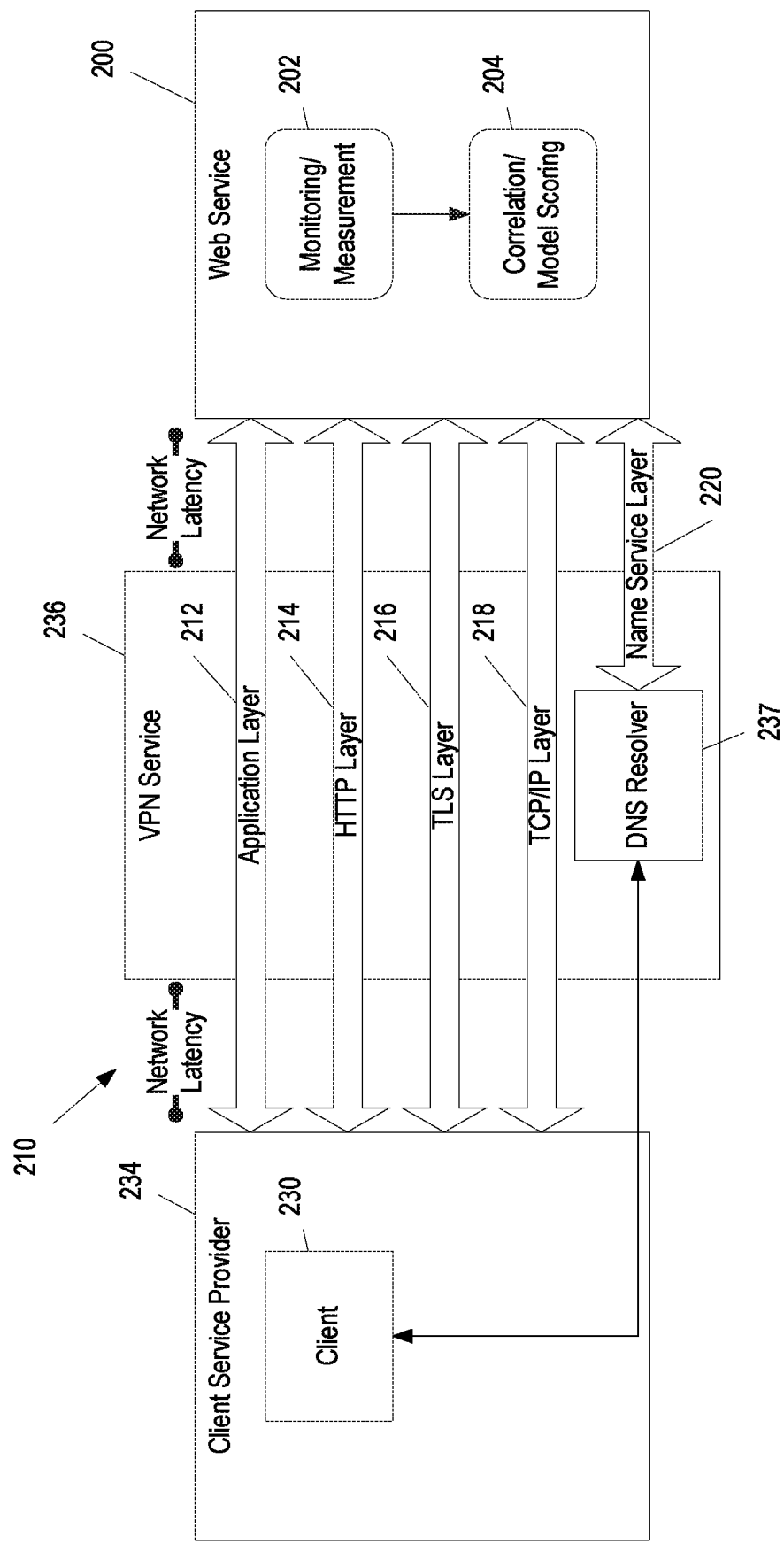
FIG. 4 illustrates a block diagram of a connection configuration between a client utilizing a VPN and a server, in accordance with at least one aspect of the present disclosure.

FIG. 4 illustrates a connection configuration where the client 230 utilizes a VPN service 236 and a DNS resolver 237 hosted by the VPN service 236. In such a connection configuration, the application layer 212, the HTTP layer 214, the TLS layer 216, and the TCP/IP layer 218 are routed through the VPN service 236 and the name service layer 220 is executed between the VPN service DNS broker 237 and the web service 200. In one aspect, the computer system 302 can determine whether one or more of the communication layers 210 are being routed through an intermediary, such as a VPN service 236, by comparing the expected latency between the apparent client 230 and the web service 200 to the observed latency associated with the communication traffic. The computer system 302 can determine the expected latency by directly probing the purported network connecting the client 230 to the computer system 302 through the use of pings and traceroutes, acquiring Border Gateway Protocol (BGP) routing data, or purchasing network latency data from Internet service providers. Using the expected latency data, the computer system 302 can establish a baseline expected latency between the web service 200 and the apparent client 230 (or VPN service 236). Differences between the latencies of one or more of the communication layers 210 and the baseline or expected latencies can indicate that computer systems in different locations from the purported client 230 are executing those communication layers 210. In one aspect, the computer system 302 can initiate multiple DNS queries by the DNS resolver 237, observe the latencies between the DNS resolver 237 and the web service 200 over those DNS queries, and compare the observed latencies against the expected latency of such network connections and/or the observed latencies of the other communication layers 210. Utilizing this technique, the computer system 302 can detect whether the DNS resolver 237 is at a different location than the actual client 230, which can in turn indicate that communications from the client 230 are being relayed through a VPN service 236. Accordingly, a computer system 302 executing the process 100 can characterize, at step 108, the illustrated connection configuration when the attributes of the communication layers 210, determined at step 106, indicate that the communication layers 210 are being routed through a VPN service 236 and that the DNS resolver 237 executing the name service layer 220 is being hosted by the VPN service 236.

Figure 5:
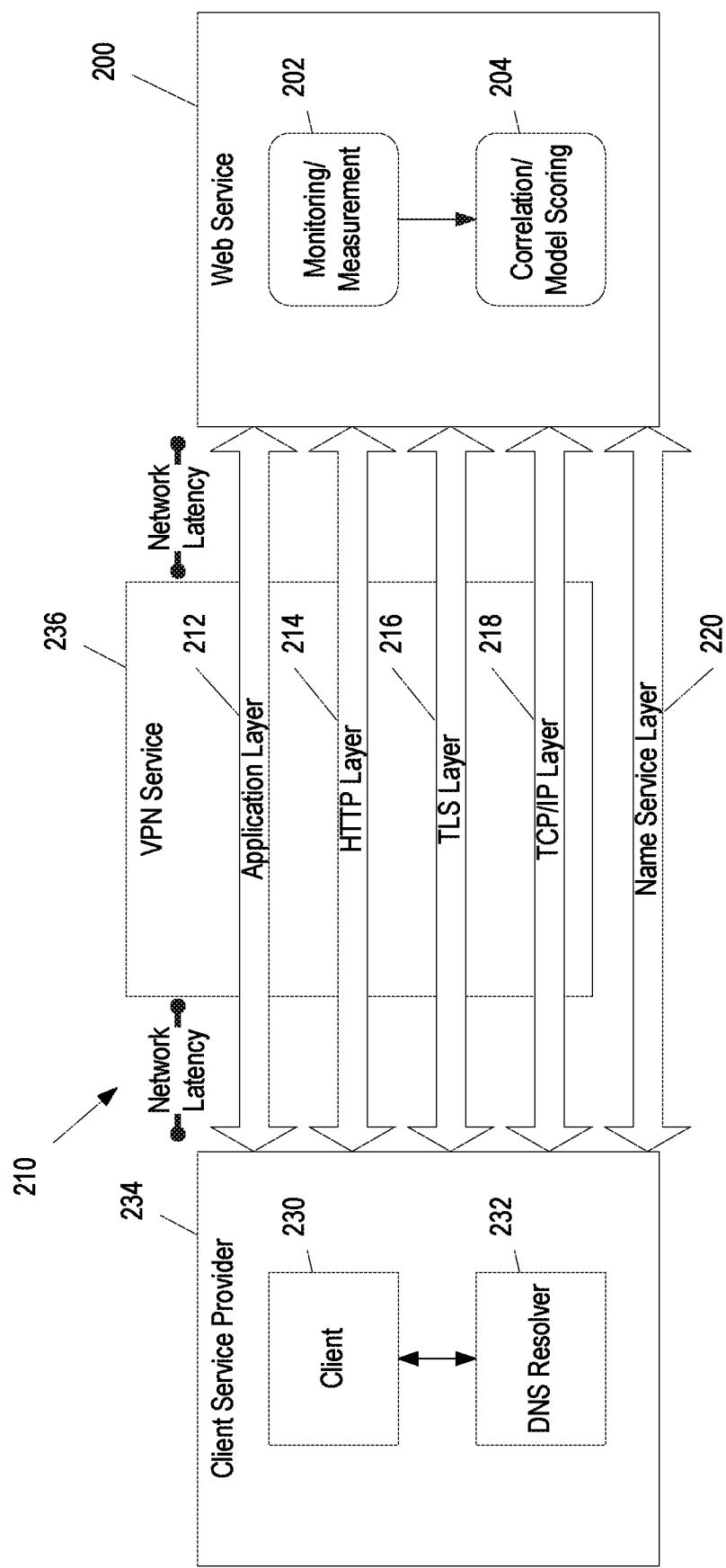
FIG. 5 illustrates a block diagram of a connection configuration between a client utilizing an external DNS and a VPN and a server, in accordance with at least one aspect of the present disclosure.

FIG. 5 illustrates a connection configuration where the client 230 utilizes a VPN service 236 and the DNS resolver 232 hosted by its client service provider 234. In such a connection configuration, the application layer 212, the HTTP layer 214, the TLS layer 216, and the TCP/IP layer 218 are routed through the VPN service 236 and the name service layer 220 is executed between the client service provider 234 and the web service 200. In one aspect, a computer system 302 can determine whether the communication layers 210 are being relayed through a VPN service 236 as described above in connection with FIG. 4. In addition to or in lieu of comparing the observed latencies associated with the name service layer 220 to baseline or expected latencies, in one aspect, the computer system 302 can characterize the name service layer 220 according to the IP address or other identifying properties associated with the DNS resolver 232. For example, the IP addresses of the DNS resolvers 232 utilized by a given ISP are known. Accordingly, the computer system 302 can detect the IP address of the DNS resolver 232 and determine whether the DNS resolver 232 utilized by the client 230 corresponds to the client's Internet service provider. Accordingly, the computer system 302 can determine whether the client 230 is utilizing a conventional DNS resolver 232 associated with the client service provider 234, as in FIG. 5, or an unconventional DNS resolver 237, as in FIG. 4. Therefore, the computer system 302 can further characterize the client connection configuration according to the identity of the DNS resolver 232, 237. Accordingly, a computer system 302 executing the process 100 can characterize, at step 108, the illustrated connection configuration when the attributes of the communication layers 210, determined at step 106, indicate that the communication layers 210 are being routed through a VPN service 236 and that the DNS resolver 232 executing the name service layer 220 is being hosted by the client service provider 234.

Figure 6:
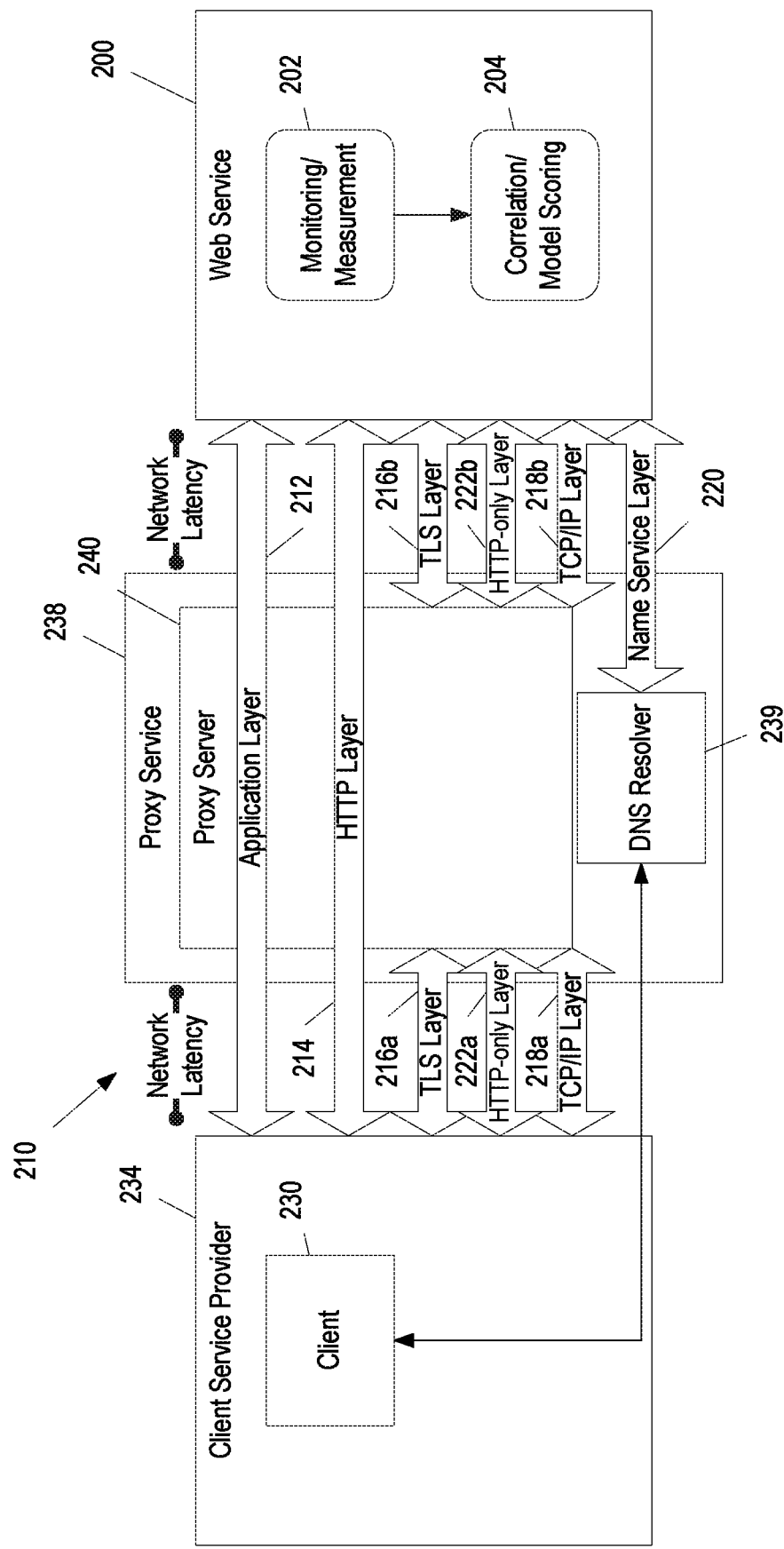
FIG. 6 illustrates a block diagram of a connection configuration between a client utilizing an HTTPS-interception proxy and a server, in accordance with at least one aspect of the present disclosure.

FIG. 6 illustrates a connection configuration where the client utilizes an HTTPS-interception proxy. In such a connection configuration, the application layer 212 and the HTTP layer 214 are routed through the proxy server 240 of the proxy service 238. Further, the TLS layer and the TCP/IP layer are each divided into a first TLS layer 216a and a first TCP/IP layer 218a executed by and between the client 230 and the proxy server 240 and a second TLS layer 216b and a second TCP/IP layer 218b executed by and between the proxy server 240 and the web service 200. Further, this particular connection configuration can include an HTTP-only layer as an additional layer, which can likewise be divided into a first HTTP-only layer 222a executed by and between the client 230 and the proxy server 240 and a second HTTP-only layer 222b executed by and between the proxy server 240 and the web service 200. Furthermore, the name service layer 220 can be executed by and between the proxy service DNS resolver 239 and the web service 200. Accordingly, a computer system 302 executing the process 100 can characterize, at step 108, the illustrated connection configuration when the attributes of the communication layers 210, determined at step 106, correspond to the depicted configuration.

Figure 7:
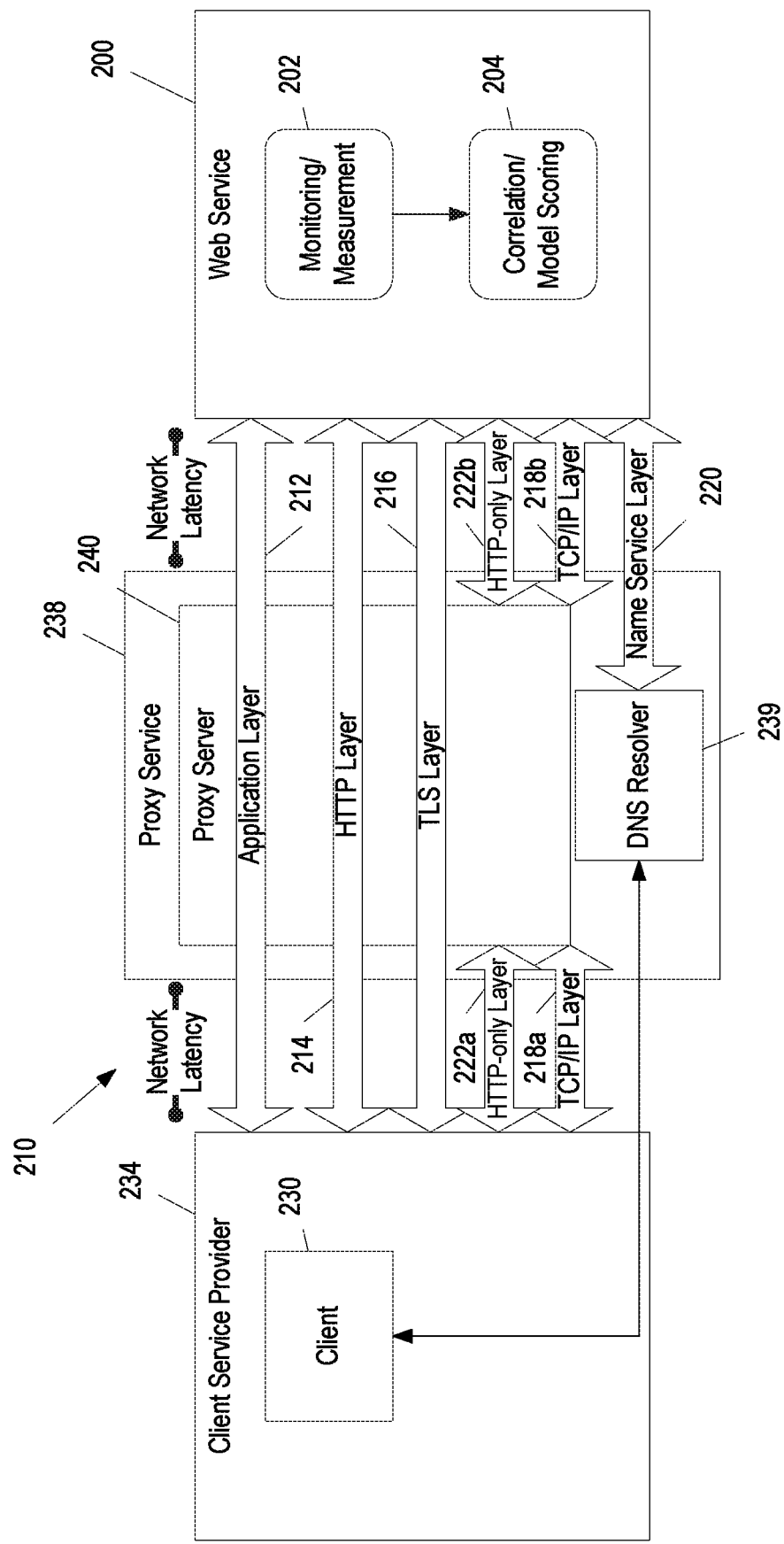
FIG. 7 illustrates a block diagram of a connection configuration between a client utilizing an HTTP caching proxy and a server, in accordance with at least one aspect of the present disclosure.

FIG. 7 illustrates a connection configuration where the client utilizes an HTTP-caching proxy to connect to a host. The configuration is similar to the configuration illustrated in FIG. 6, except that the TLS layer 216 is routed through the proxy server 240, rather than being executed separately between the client 230 and the proxy server 240 and between the proxy server 240 and the web service 200. Accordingly, a computer system 302 executing the process 100 can characterize, at step 108, the illustrated connection configuration when the attributes of the communication layers 210, determined at step 106, correspond to the depicted configuration.

Figure 8A:
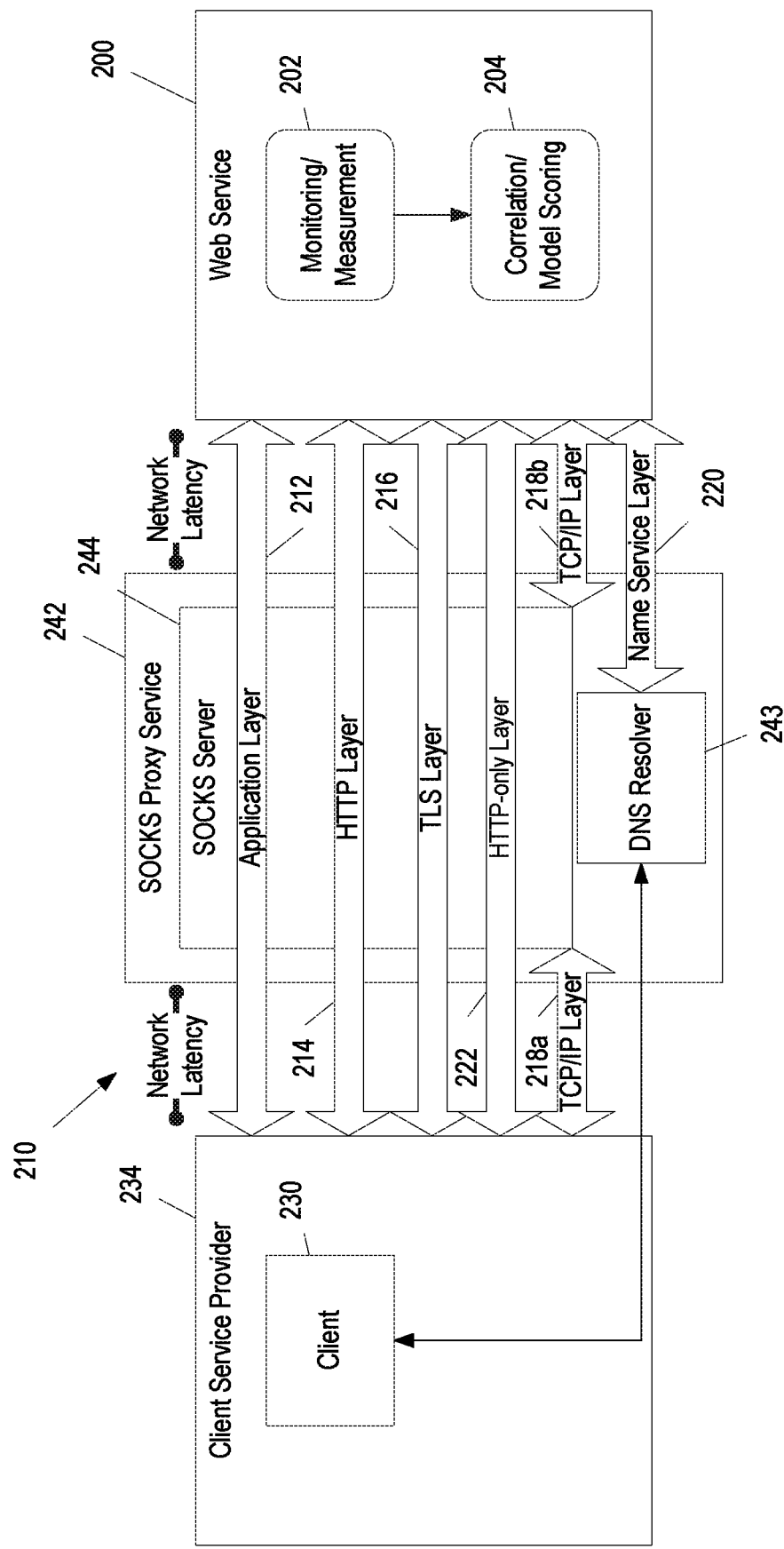
FIG. 8A illustrates a block diagram of a first connection configuration between a client utilizing a SOCKS proxy and a server, in accordance with at least one aspect of the present disclosure.
Figure 8B:
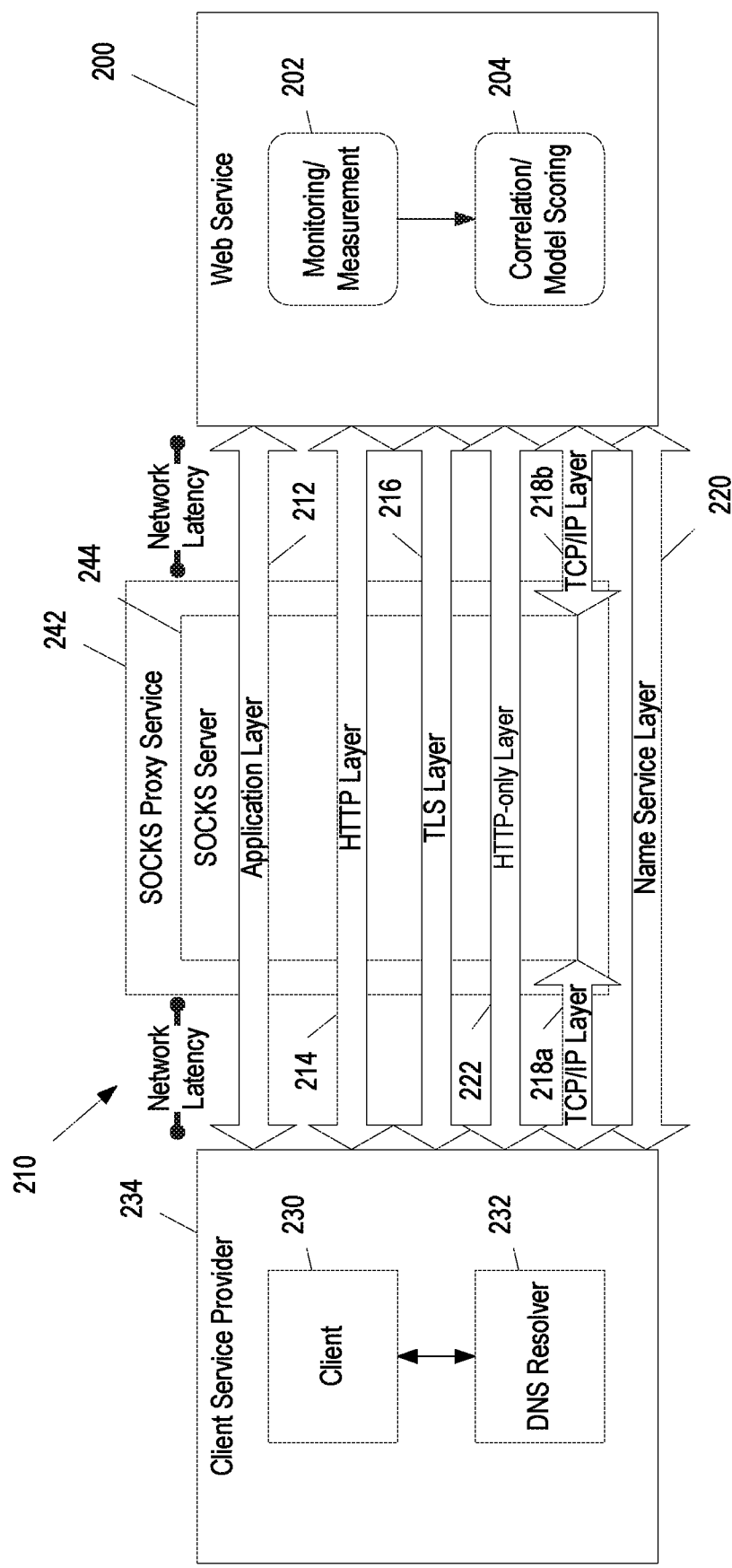
FIG. 8B illustrates a block diagram of a second connection configuration between a client utilizing a SOCKS proxy and a server, in accordance with at least one aspect of the present disclosure.

FIGS. 8A and 8B illustrate alternative implementations of configurations where the client utilizes a SOCKS proxy to connect to a host. In either implementation, the application layer 212, HTTP layer 214, TLS layer 216, and HTTP-only layer 220 are routed through the SOCKS proxy service 242 and the TCP/IP layer is divided into a first TCP/IP layer 218a executed by and between the client 230 and the SOCKS proxy server 244 and a second TCP/IP layer 218b executed by and between the SOCKS proxy server 244 and the web service 200. In the implementation illustrated in FIG. 8A, the SOCKS proxy service 242 provides a SOCKS service DNS resolver 243 that resolves all DNS requests for the client 230. In the implementation illustrated in FIG. 8B, the client 230 utilizes the DNS resolver 232 of its client service provider 234. Accordingly, a computer system 302 executing the process 100 can characterize, at step 108, the illustrated connection configuration when the attributes of the communication layers 210, determined at step 106, correspond to the depicted configurations.

Figure 9:
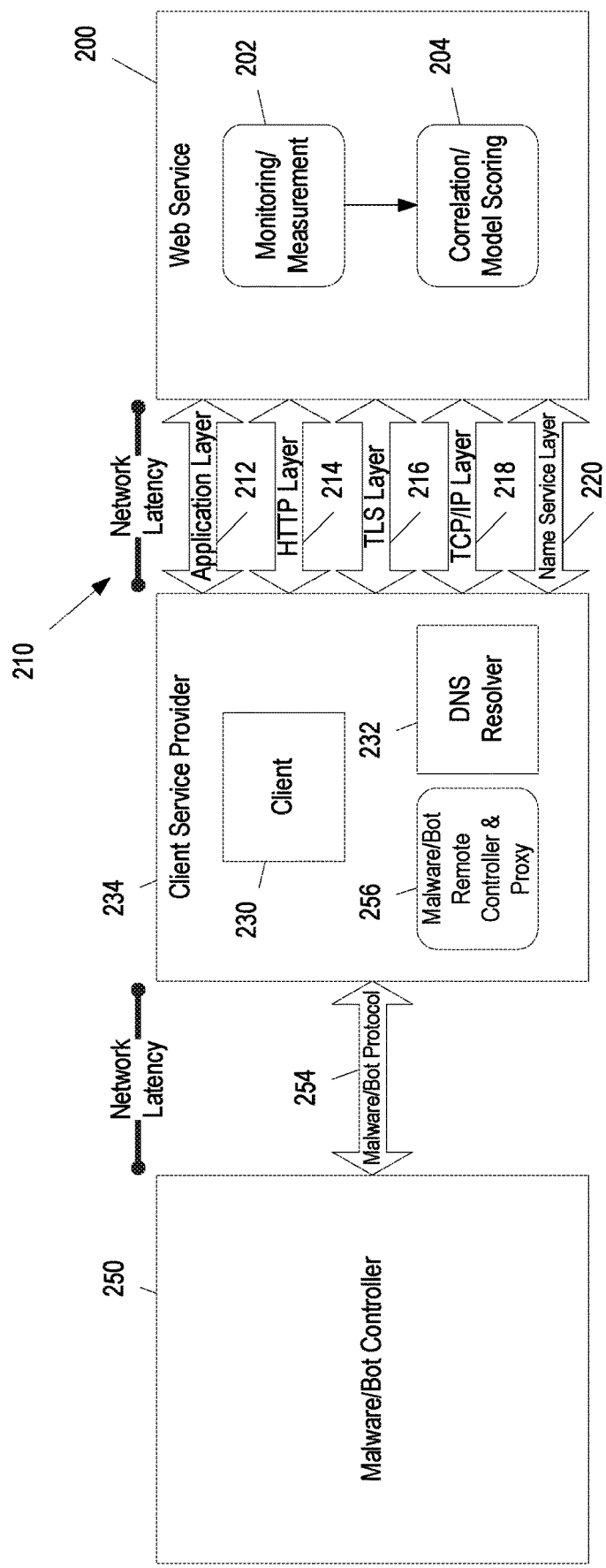
FIG. 9 illustrates a block diagram of a connection configuration between a malware-hijacked client or bot and a server, in accordance with at least one aspect of the present disclosure.

FIG. 9 illustrates a connection configuration where a headless or malware/bot-controlled client is operated to connect to a host. In such a connection configuration, a malware or bot controller 250 controls a client 230 via a malware/bot protocol 254 that dictates how the client 230 is to be controlled to various software applications or modules (e.g., malware/bot remote controller and proxy module(s) 256) being executed by the computer system on which the client 230 is being executed. Because all data communicated through the communication layers 210 to the client 230 must then be communicated to the malware/bot controller 250, which then must process the data and initiate a response or instructions that is sent back to the client 230, there can be a not-insignificant amount of additional latency across all of the communication layers 210 compared to the expected latency for the client 230. As noted above, the expected latency for the client 230 can be determined based on the expected route of data transmitted to the client 230 based on the purported location of the client 230 and the profiled latencies associated with the network(s) through which the data is transmitted. This additional latency can thus indicate that the client 230 is headless or hijacked by malware/bot protocols. Accordingly, a computer system 302 executing the process 100 can characterize, at step 108, the illustrated connection configuration when the attributes of the communication layers 210, determined at step 106, correspond to the depicted configuration.

As can be seen in the examples illustrated FIGS. 2-9, connection configuration types differ from each other in terms of how and by which computer systems the various communication layers 210 are being executed. Therefore, by detecting attributes associated with the communication layers 210 that indicate how and by which systems they are being executed, a system (e.g., a web service 200 executed by or communicably coupled to the host computer system 302) can characterize what type of connection configuration a client 230 is utilizing to connect to the host computer system 302. Once the client connection configuration has been characterized, the host computer system 302 can take a variety of different actions. In one aspect, the computer system 302 can be programmed to score the client connection configuration according to, for example, the degree of risk associated with the particular connection configuration type. For example, a client 230 connecting to a host computer system 302 utilizing a conventional connection configuration (FIG. 2) can be designated as non-risky or assigned a negligible risk score. Conversely, a client 230 connecting to a host computer system 302 that is headless, controlled by malware, or part of a botnet (FIG. 9) can be designated as highly risky or assigned a high-risk score. In various aspects, the computer system 302 can take various actions depending on the risk score assigned to the client 230, including, for example, terminating the session between the client 230 and the computer system 302, seeking review by a human operator, saving the data associated with the client 230 or client session, and/or requiring that the user satisfy elevated security measures (e.g., log in via two-factor authentication). In one aspect, the computer system 302 can receive the user's login credentials that are entered via the client 230 to access the web pages, web services, web applications, and so on offered by the client 230. The computer system 302 can then retrieve a base or normal connection configuration that had been previously characterized and stored for the given user credentials and then compare the present connection configuration to the base connection configuration type. The computer system 302 can then, for example, determine a score for the present connection configuration according to how the present connection configuration deviates from the base connection configuration type and take other actions accordingly, as described above.

In one general aspect, therefore, the present invention is directed to a computer-implemented method for characterizing a present connection configuration of a client 230 connecting to a computer system 302. The method comprises storing a base connection configuration associated with user credentials of the client 230. The method also comprises, after storing the base connection configuration, redirecting, by the computer system 302, a session request for the client 230 via a data network 314 to web service 200 to establish a client session between the client 230 and the web service 200, the client session comprises a plurality of communication layers (e.g., communication layers 212-220) executed by and between the client 230 and the web service 200. The method also comprises, after storing the base connection configuration: determining, by the web service 200, an attribute of each of the communication layers by the web service 200, where determining the attributes comprises inducing the client 230 to access a system and measuring attributes from the client 230 accessing the system; characterizing, by the web service 200, the connection configuration of the client 230 according to the attribute of each of the communication layers; determining, by the web service 200, a score for the present connection configuration based, at least in part, on (i) a comparison of configuration settings across the communication layers and (ii) how the present connection configuration deviates from the base connection configuration for the client 230; and taking an action for the present connection configuration based on the score.

The computer systems described herein, such as and including the host computer system 302 and the external computer system 308, could be implemented with one or a number (e.g., a network or cluster) of computer devices, such as servers, mainframes, etc. The computer systems may comprise one or more processors 306, 312 and computer memory 304, 310. The processors 306, 312 may comprise CPUs and/or GPUs. The computer memory 304, 310 may comprise primary storage (e.g., ROM, RAM) and/or secondary storage (e.g., HDD, flash, SSD), for example.

The software modules described herein may be implemented as software code to be executed by the processor(s) of the computing systems using any suitable computer language, such as, for example, SAS, Java, C, C++, or Perl using, for example, conventional or object-oriented techniques. The software code may be stored as a series of instructions or commands in the computer memories.

The examples presented herein are intended to illustrate potential and specific implementations of the present invention. It can be appreciated that the examples are intended primarily for purposes of illustration of the invention for those skilled in the art. No particular aspect or aspects of the examples are necessarily intended to limit the scope of the present invention.

Further, it is to be understood that the figures and descriptions of the present invention have been simplified to illustrate elements that are relevant for a clear understanding of the present invention, while eliminating, for purposes of clarity, other elements. While various embodiments have been described herein, it should be apparent that various modifications, alterations, and adaptations to those embodiments may occur to persons skilled in the art with attainment of at least some of the advantages. The disclosed embodiments are therefore intended to include all such modifications, alterations, and adaptations without departing from the scope of the embodiments as set forth herein.

The invention claimed is:

1. A computer-implemented method for characterizing a present connection configuration of a client connecting to a computer system, the method comprising:
   storing a base connection configuration associated with user credentials of the client; and after storing the base connection configuration:
      redirecting, by the computer system, a session request from the client via a data network to a web service to establish a client session between the client and the web service, the client session comprising a plurality of communication layers executed by and between the client and the web service;
      determining, by the web service, an attribute of each of the plurality of communication layers, wherein determining the attributes comprises inducing the client to access an external system and measuring attributes from the client accessing the external system;
      characterizing, by the web service, the connection configuration of the client according to the attribute of each of the plurality of communication layers;
      determining, by the web service, a score for the present connection configuration based, at least in part, on (i) a comparison of configuration settings across the plurality of communication layers and (ii) how the present connection configuration deviates from the base connection configuration for the client; and
      taking an action for the present connection configuration based on the score.

2. The computer-implemented method of claim 1, wherein the plurality of communication layers comprise an application layer and the attribute comprises a browser feature indicative of a browser type of the client.

3. The computer-implemented method of claim 1, wherein the plurality of communication layers comprise an HTTP layer and the attribute comprises a latency and/or a configuration setting of the HTTP layer.

4. The computer-implemented method of claim 3, wherein determining the attribute of the HTTP layer comprises:
   transmitting, by the web service, an HTTP request to the client; and
   determining, by the web service, the latency associated with the HTTP request according to when a response to the HTTP request is received by the web service.

5. The computer-implemented method of claim 1, wherein the plurality of communication layers comprise a TCP/IP layer and the attribute comprises a latency, a configuration setting of the TCP/IP layer, and/or an IP address identity of a client endpoint.

6. The computer-implemented method of claim 1, wherein the plurality of communication layers comprise an encryption layer and the attribute comprises a latency and/or a configuration setting of the encryption layer.

7. The computer-implemented method of claim 1, wherein the plurality of communication layers comprise a name service layer and the attribute comprises a latency of the name service layer and/or an identity of a naming service associated with the name service layer.

8. The computer-implemented method of claim 1, wherein the score corresponds to a degree of risk assigned to a type of connection configuration for the present connection configuration.

9. The computer-implemented method of claim 1, wherein taking the action comprises terminating, by the computer system, the client session based on the score.

10. A computer-implemented method for characterizing a present connection configuration of a client connecting to a computer system, the method comprising:
   storing a base connection configuration associated with user credentials of the client and after storing the base connection configuration:
      connecting, by the computer system, a session request from the client via a data network to a web service hosted by the computer system to establish a client session between the client and the web service, the client session comprising a plurality of communication layers executed by and between the client and the web service;
      determining, by the web service, an attribute of each of the plurality of communication layers, wherein determining the attributes comprises inducing the client to access an external system and measuring attributes from the client accessing the external system;
      characterizing, by the computer system, the connection configuration of the client according to the attribute of each of the plurality of communication layers;
      determining, by the computer system, a score for the present connection configuration based, at least in part, on (i) a comparison of configuration settings across the plurality of communication layers and (ii) how the present connection configuration deviates from the base connection configuration for the client; and
      taking an action for the present connection configuration based on the score.

11. The computer-implemented method of claim 10, wherein the plurality of communication layers comprise an application layer and the attribute comprises a browser feature indicative of a browser type of the client.

12. The computer-implemented method of claim 10, wherein the plurality of communication layers comprise an HTTP layer and the attribute comprises a latency and/or a configuration setting of the HTTP layer.

13. The computer-implemented method of claim 12, wherein determining the attribute of the HTTP layer comprises:
   transmitting, by the computer system, an HTTP request to the client; and
   determining, by the computer system, the latency associated with the HTTP request according to when a response to the HTTP request is received by the web service.

14. The computer-implemented method of claim 10, wherein the plurality of communication layers comprise a TCP/IP layer and the attribute comprises a latency, a configuration setting of the TCP/IP layer, and/or an IP address identity of a client endpoint.

15. The computer-implemented method of claim 10, wherein the plurality of communication layers comprise an encryption layer and the attribute comprises a latency and/or a configuration setting of the encryption layer.

16. The computer-implemented method of claim 10, wherein the plurality of communication layers comprise a name service layer and the attribute comprises a latency of the name service layer and/or an identity of a naming service associated with the name service layer.

17. The computer-implemented method of claim 10, wherein the score corresponds to a degree of risk assigned to a type of connection configuration for the present connection configuration.

18. The computer-implemented method of claim 10, wherein taking the action comprises terminating, by the computer system, the client session based on the score.

19. A computer system for characterizing a present connection configuration of a client connecting to the computer system, the computer system comprising:
   one or more processors; and
   a memory coupled to the one or more processors, the memory storing instructions that, when executed by the one or more processors, cause the computer system to:
      host a web service;
      connect a session request from the client via a data network to the web service to establish a client session between the client and the web service, the client session comprising a plurality of communication layers executed by and between the client and the web service;
      determine an attribute of each of the plurality of communication layers by the web service, wherein determining the attributes comprises inducing the client to access an external system and measuring attributes from the client accessing the external system;
      characterize the connection configuration of the client according to the attribute of each of the plurality of communication layers;
      determine a score for the present connection configuration based, at least in part, on (i) a comparison of configuration settings across the plurality of communication layers and (ii) how the present connection configuration deviates from the base connection configuration for the client; and
      taking an action for the present connection configuration based on the score.

20. The computer system of claim 19, wherein the plurality of communication layers comprise an application layer and the attribute comprises a browser feature indicative of a browser type of the client.

21. The computer system of claim 19, wherein the plurality of communication layers comprise an HTTP layer and the attribute comprises a latency and/or a configuration setting of the HTTP layer.

22. The computer system of claim 21, wherein the memory stores further instructions that, when executed by one or more processors, cause the computer system to:
   transmit an HTTP request to the client; and
   determine the latency associated with the HTTP request according to when a response to the HTTP request is received by the web service.

23. The computer system of claim 19, wherein the plurality of communication layers comprise a TCP/IP layer and the attribute comprises a latency, a configuration setting of the TCP/IP layer, and/or an IP address identity of a client endpoint.

24. The computer system of claim 19, wherein the plurality of communication layers comprise an encryption layer and the attribute comprises a latency and/or a configuration setting of the encryption layer.

25. The computer system of claim 19, wherein the plurality of communication layers comprise a name service layer and the attribute comprises a latency of the name service layer and/or an identity of a naming service associated with the name service layer.

26. The computer system of claim 19, wherein the score corresponds to a degree of risk assigned to a type of connection configuration for the present connection configuration.

27. The computer system of claim 19, wherein the action comprises terminating the client session according to the score.

28. The computer-implemented method of claim 1, wherein taking the action comprises recording the present connection configuration.

29. The computer-implemented method of claim 1, wherein the external system comprises a DNS resolver.

* * * * *